United States Patent [19]
Devenyi

[11] Patent Number: 6,123,426
[45] Date of Patent: Sep. 26, 2000

[54] ANTI-JAM LINEAR LEADSCREW DRIVE AND DEVICES UTILIZING THE DRIVE

[75] Inventor: Gabor Devenyi, Penetang, Canada

[73] Assignee: Raytheon Company, Lexington, Mass.

[21] Appl. No.: 09/234,045

[22] Filed: Jan. 19, 1999

[51] Int. Cl.[7] .................................................. G03B 21/14
[52] U.S. Cl. ............................................. 353/101; 74/841
[58] Field of Search ..................................... 396/144, 133; 359/873; 355/39, 44, 45; 192/116.5, 125 B, 138, 141, 139; 353/100, 119, 101; 74/841, 424, 8

[56] References Cited

U.S. PATENT DOCUMENTS

| | | | |
|---|---|---|---|
| 3,293,925 | 12/1966 | Linsley | 74/10.2 |
| 4,723,453 | 2/1988 | Kannapan et al. | 74/89.15 |
| 5,808,757 | 9/1998 | Ikeda | 358/498 |

Primary Examiner—Safet Metjahic
Assistant Examiner—Etienne LeRoux
Attorney, Agent, or Firm—William C. Schubert; Glenn H. Lenzen, Jr.

[57] ABSTRACT

A linear actuator (20) includes a frame (50) having a frame bore (52) that is threaded with an internal coarse thread (54). An antijam nut (56) is externally threaded with the coarse thread (58) and engaged to the internal coarse thread (54) of the frame bore (52) within the frame bore (52). The antijam nut (56) is also internally threaded with a fine thread (62). A first antijam nut endstop (70) is affixed to the frame (50) such that the antijam nut (56) contacts the first antijam nut endstop (70) at a first range limit within the frame bore (52). A leadscrew (64) has a first portion externally threaded with the fine thread (66) and engaged to the internal fine thread (62) of the antijam nut (56). A leadscrew support (82) is engaged to the leadscrew (64), and a rotational drive (84) is connected to the leadscrew (64). The frame (50) and the leadscrew support (82) are linearly movable relative to each other. As the leadscrew (64) turns the antijam nut (56) and the antijam nut (56) is released from the antijam nut endstop (70), the frame (50) is released from its first hard stop (69) and moved until it is stopped by the opposite endstop of the frame (50). When the leadscrew (64) is reversed, it backs the antijam nut (56) away from the first antijam nut (56) endstop, again releasing the frame (50), and the leadscrew (64) moves the frame (50) in the opposite direction until the next hard stop (69) is reached by the moving frame (50).

19 Claims, 3 Drawing Sheets

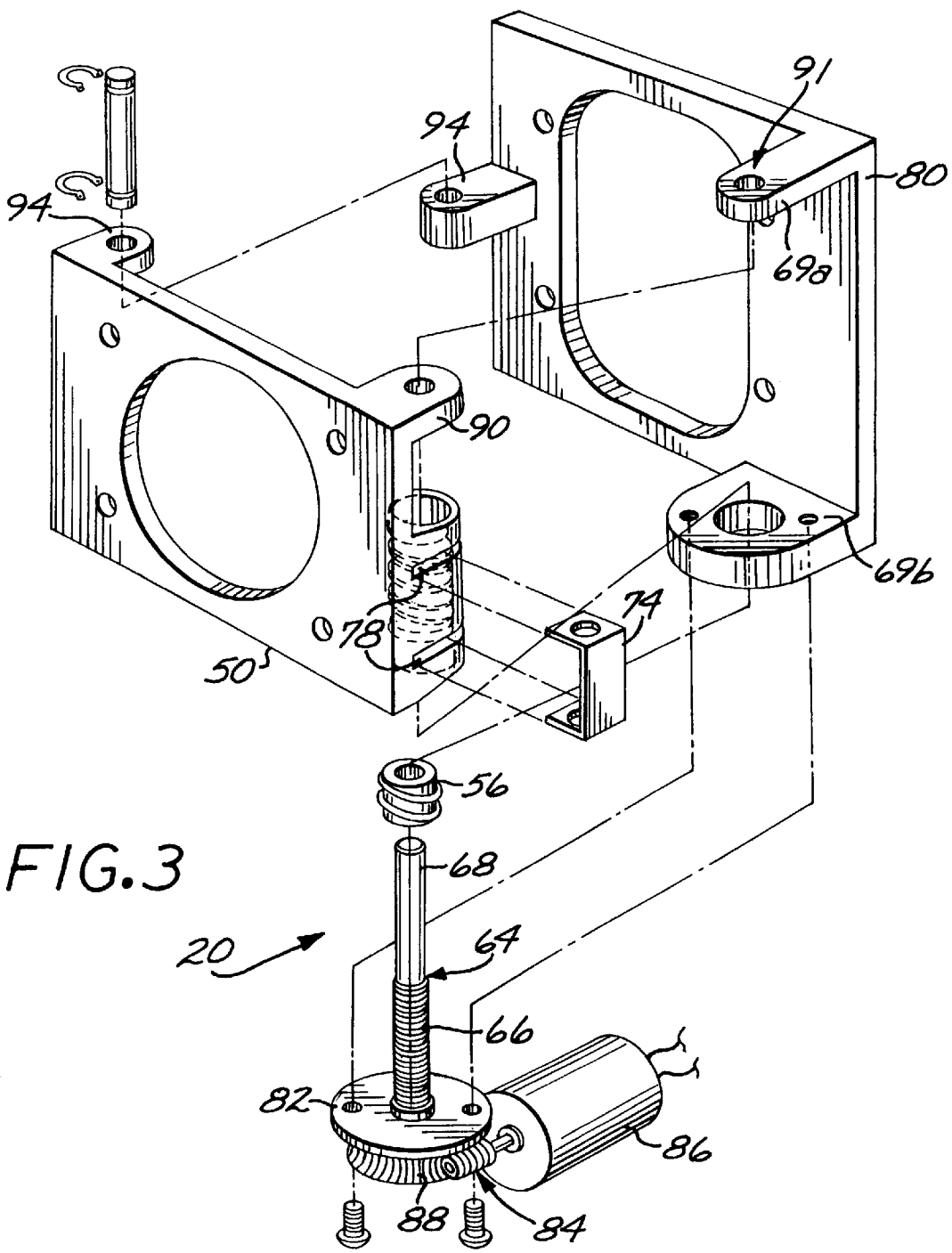

ANTI-JAM LINEAR LEADSCREW DRIVE AND DEVICES UTILIZING THE DRIVE

BACKGROUND OF THE INVENTION

This invention relates to a linear drive, and more particularly, to a linear drive that prevents jamming at a hard endstop upon being reversed.

In many applications, a movable structure is moved linearly until it reaches a limiting stationary structure. In an exemplary application of particular interest to the inventor, a frame holding a lens is moved linearly, within limits, in a projector as the projector is tilted, to minimize distortion of the image projected through the lens. The linear movement must be reversible, to account for a tilt back to the original position.

If the movable structure is driven continuously into the stationary structure, one or both may be damaged, or the movable structure may be jammed against the stationary structure so that it cannot be reversed. To prevent these problems, some type of limiting mechanism is usually provided. In one approach, the drive motor is sized to be sufficiently small that it cannot drive the movable structure into the stationary limiting structure with sufficient force to damage them. This technique may result in jamming of the movable structure against the stationary structure, with the drive motor having insufficient reversing force from the stalled condition to back the movable structure away from the stationary structure.

In another approach, range limiting microswitches are positioned so that the drive motor is stopped at a preselected location before the moving element is jammed into the stationary limiting structure. Failure or misadjustment, either initially or over time, of the microswitch causes a failure which may render the device inoperable or result in damage the structure.

In yet another approach, a torque-limiting clutch is placed into the drive train of the drive motor so that, when the movable structure encounters the stationary structure, the maximum force that can be exerted between the two is limited. The use of the limiting clutch has the drawback that the electronic drive must "spike" the power to the motor power supply to obtain a higher torque to unstick the leadscrew from the jammed condition, when the motor is reversed. Further, the clutch must remain properly adjusted, or the limiting effect is lost. Normal wear over time may be sufficient to lose the beneficial effect of the clutch.

In these approaches, and others as well, the limiting mechanism adds weight and cost to the structure and product, and is a potential source of failure during service. There is therefore a need for an improved approach to linear drives whose extent of travel must be limited, and which must be reversing. The present invention fulfills this need, and further provides related advantages.

SUMMARY OF THE INVENTION

The present invention provides a linear actuator which is self-limiting so that it cannot produce a jamming of a linearly movable structure against a stationary structure. The linear actuator is reversible, so that the movable structure is readily backed away from its range limit and moved in the opposite direction, optionally to an opposite range limit. The structure is not complex mechanically, and is relatively inexpensive to build and install. It is reliable in service, as there are no electrical or complex mechanical elements to fail. The linear actuator of the invention may be used with a wide variety of devices that require a limited linear movement.

In accordance with the invention, a linear actuator comprises a frame having a frame bore therein which is threaded with an internal coarse thread. An antijam nut is externally threaded with the same coarse thread and engaged to the internal coarse thread of the frame bore within the frame bore. The antijam nut has a nut bore which is internally threaded with a fine thread. A first antijam nut endstop is affixed to the frame such that the antijam nut contacts the first antijam nut endstop at a first range limit within the frame bore. A leadscrew has at least a portion thereof externally threaded with the same fine thread and is engaged to the internal fine thread of the antijam nut. A leadscrew support is engaged to the leadscrew. A rotational drive is connected to the leadscrew. The frame and the leadscrew support are linearly movable relative to each other. An unthreaded portion of the leadscrew may extend through a guide bore on a guide receiver of the frame, to provide a linear guiding function. Other guide rods may also be present, as desired for the particular structure.

As the drive turns the leadscrew with the fine threads, the antijam nut turns on its external coarse threads and translates relative to the frame, axially unloading the leadscrew from the loading experienced when the frame encounters a hard endstop. In the usual case, the leadscrew and its support are viewed as stationary, so that the frame translates as the leadscrew and antijam nut turn. When the antijam nut reaches its first limit, it contacts the first antijam nut endstop and stops turning. The drive, which is preferably a motor connected to the leadscrew through a worm gear drive, further drives the frame until it is stopped by its hard endstop and the motor stalls. To reverse the travel, the drive is reversed, backing the antijam nut away from the first antijam nut endstop and unloading the axial pressure on the leadscrew. A second antijam nut endstop is provided at the opposite end of the travel of the nut, allowing the same process to function there. That is, the frame is driven into the opposite hard endstop and the drive motor stalls again. The interior fine thread and exterior coarse thread allow the antijam nut to back away from the antijam nut endstop with the drive in an unstalled state, due to the coarseness of the exterior thread.

The terms "coarse thread" and "fine thread" as used herein are relative to each other. Specifically, the external thread of the antijam nut must be coarser (fewer turns per inch) than the internal thread of the antijam nut. Preferably, a ratio of a fine thread turns-per-inch to a coarse thread turns-per-inch is from about 5:1 to about 15:1 Also preferably, the coarse thread has no more than about 6½ turns per inch for a ½ inch outside diameter of the antijam nut, and the fine thread has at least about 32 turns per inch for a ¼ inch inside diameter of the antijam nut.

The present invention provides a convenient linear actuator that achieves self-limiting and antijam features without the use of electrical limiting components such as limit switches, and without the use of complex mechanical devices such as torque-limiting clutches. It is therefore inexpensive to install and utilize, and reliable in service. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is an exploded assembly view of the linear actuator of FIG. 2 used in the projector of FIG. 1.

DETAILED DESCRIPTION OF THE INVENTION

Figure 1:
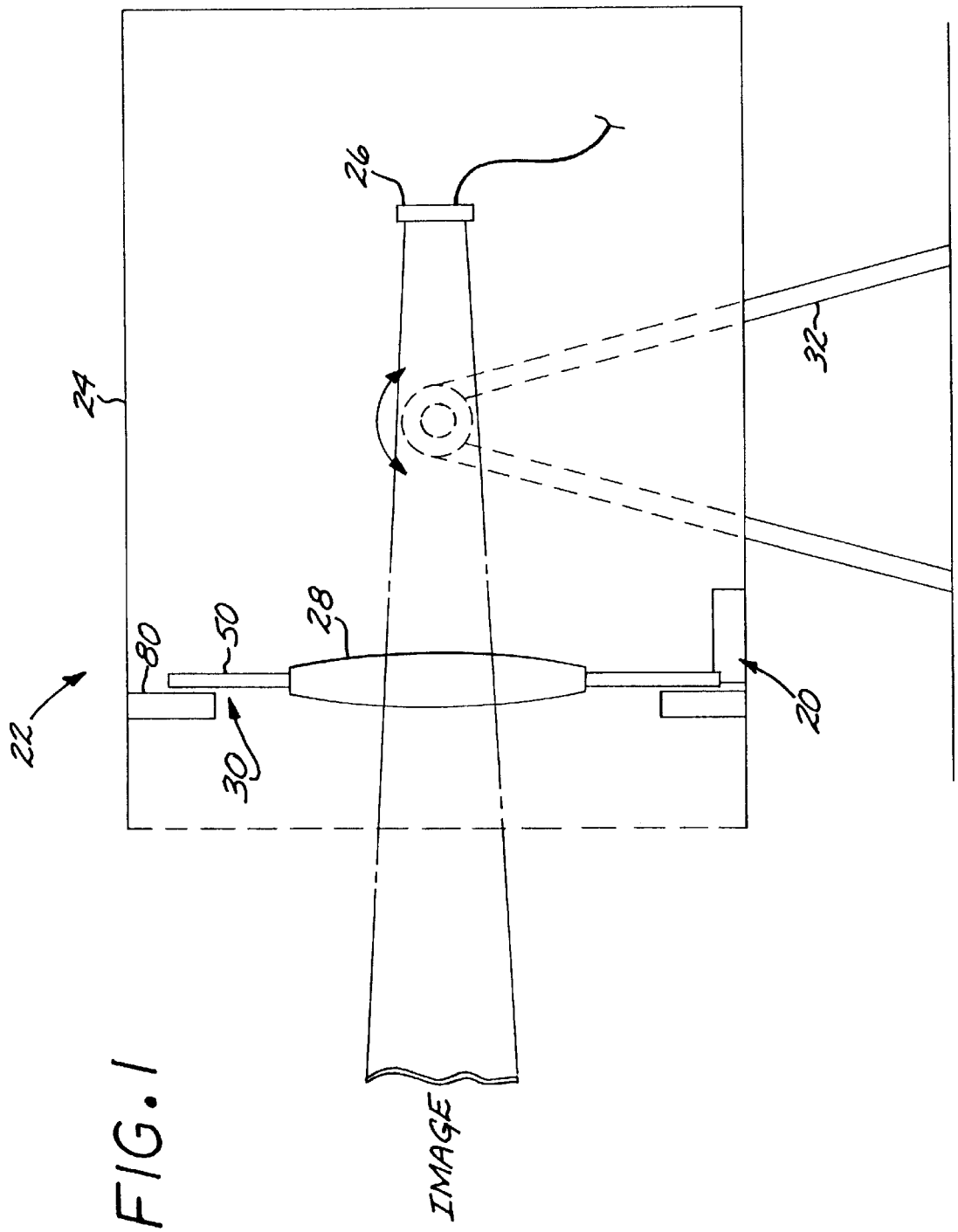
FIG. 1 is an elevational view of a projector utilizing a linear actuator in the lens holder frame.

FIG. 1 depicts a preferred application of the present invention, a linear actuator 20 utilized in a liquid crystal display (LCD) projector 22. The projector includes a housing 24 enclosing a liquid crystal display 26. An image produced by the liquid crystal display 26 is projected through a lens system mounted within the housing 24, here depicted schematically as a lens 28. The lens 28 is mounted in a frame structure 30 so as to be linearly movable in a direction approximately perpendicular to the direction of projection of the image. The housing 24 is pivotably mounted on an external support 32. If the housing 24 is pivoted so as to project the image higher or lower on a screen (not shown) and the lens 28 remains stationary, the image is distorted by a type of distortion termed keystone distortion. It is therefore necessary to move the lens 28 linearly upwardly or downwardly responsive to the pivoting of the housing, to minimize the keystone distortion of the image.

Figure 2:
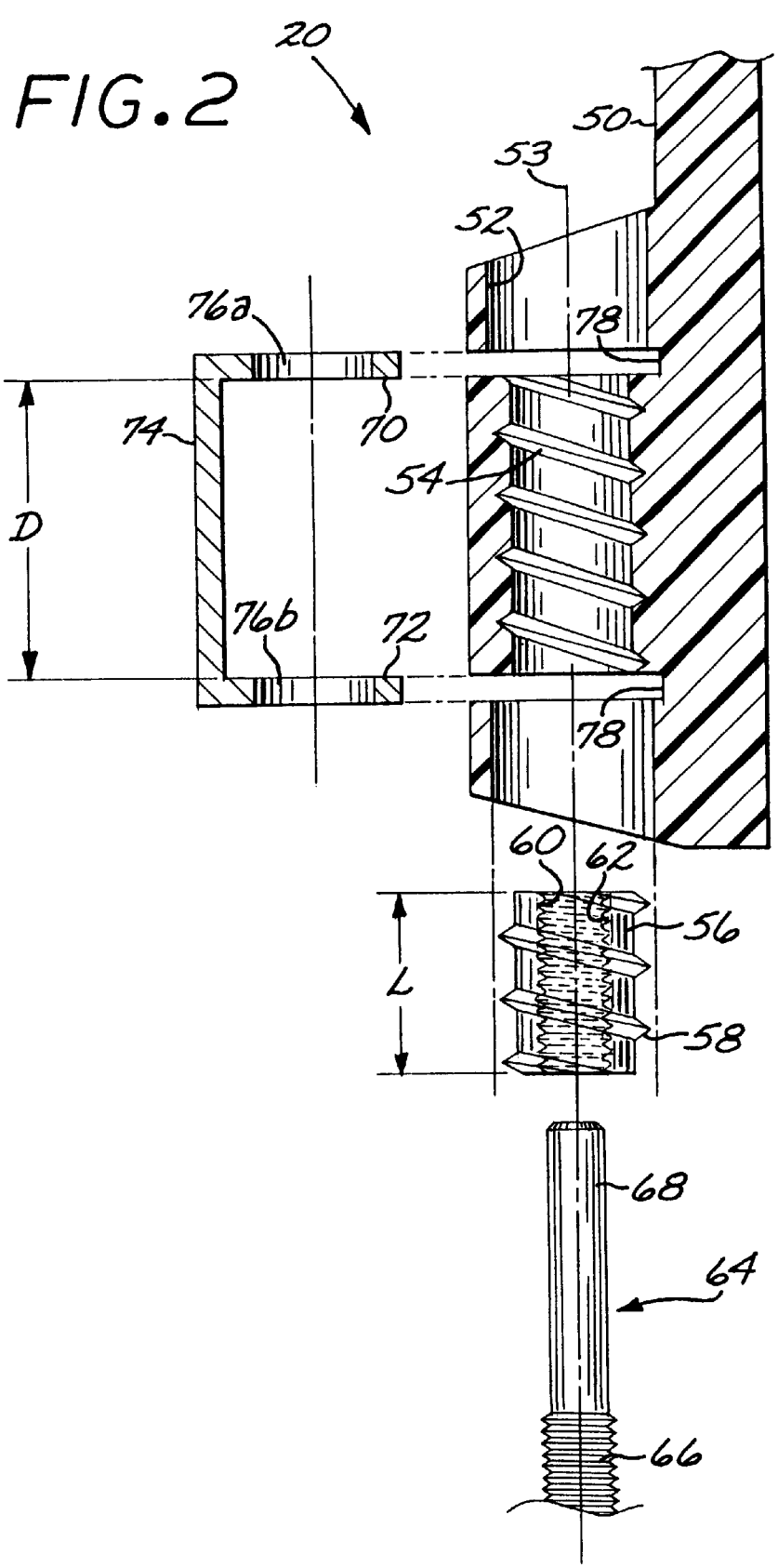
FIG. 2 is a schematic exploded view of a linear actuator according to the invention.

FIGS. 2 and 3 illustrate a preferred form of the linear actuator 20 according to the invention and utilized in the projector 22. The use of the linear actuator 20 is not limited to this preferred application, however, and is more broadly applicable to devices requiring a limited linear motion.

Referring to FIG. 2, the linear actuator 20 includes a frame 50 having a frame bore 52 therein with a frame bore axis 53. The frame bore 52 is internally threaded over at least a central portion of its length with an internal coarse thread 54, preferably having a diameter of about ½ inch and about 5 turns per inch for the projector application. An antijam nut 56 is externally threaded with an external coarse thread 58 having the same coarse turns per inch as the internal coarse thread 54. When the linear actuator 20 is assembled, the antijam nut 56 is received within the frame bore 52, with the external coarse thread 58 engaged to the internal coarse thread 54.

The antijam nut 56 has an axial nut bore 60 therethrough, whose axis is coincident with the axis of turning of the nut on the external coarse threads 58. The nut bore 60 is internally threaded with an internal fine thread 62, preferably having a diameter of about ¼ inch and about 50 turns per inch for the projector application. The terms "coarse thread" and "fine thread" as used herein are relative to each other. The external coarse thread 58 of the antijam nut must be coarser (that is, fewer turns per inch) than the internal fine thread 62 of the antijam nut. Preferably a ratio of a fine thread turns-per-inch to a coarse thread turns-per-inch is from about 5:1 to about 15:1. If the ratio is outside these limits, the linear actuator 20 is operable, but may be inclined to stick when the movement is reversed. Also preferably, the coarse thread has no more than about 6½ turns per inch, and the fine thread has at least about 32 turns per inch.

A leadscrew 64 is an elongated rod having at least a portion thereof externally threaded with an external fine thread 66 having the same turns per inch as the internal fine thread 62. Another portion 68 is left unthreaded to serve as a guide rod, as will be discussed subsequently. When the linear actuator is assembled, the external fine thread 66 is engaged to the internal fine thread 62 of the antijam nut 56. The frame 50 slides parallel to the direction of elongation of the leadscrew (which is also its axis of rotation, both of which are parallel to the frame bore axis 53), with its absolute limits of travel parallel to the axis 53 and limited by hard endstops 69a and 69b.

A first antijam nut endstop 70 is affixed to the frame 50 at a first location such that the antijam nut 56 contacts the first antijam nut endstop 70 at a first range limit of the motion of the antijam nut 56 within the frame bore 52. In most instances, a second antijam nut endstop 72 is affixed to the frame 50 at a second location such that the antijam nut 56 contacts the second antijam nut endstop 72 at a second range limit of the motion of the antijam nut 56 with in the frame bore 52. That is, the distance D between the two antijam nut endstops 70 and 72 is greater than the length L of the antijam nut 56. The two antijam nut endstops 70 and 72 are conveniently fabricated as a single U-shaped bracket 74, with the arms 76a and 76b forming the endstops 70 and 72, respectively. The bracket 74 is received in a pair of slots 78 in the frame 50. This structure facilitates the assembly of the linear actuator, wherein the antijam nut 56 is threaded into the internal coarse threads 54, and then the bracket 74 is inserted and secured in the slots 78. The leadscrew 64 is thereafter engaged to the antijam nut 56 by the fine threads 62 and 66.

In operation of the assembled linear actuator 20 (in a sequence starting with the frame 50 driven against one of the hard endstops 69), the leadscrew 64 is turned, thereby moving the antijam nut 56 parallel to the frame bore axis 53 by the movement of the fine threads 62 and 66. As the antijam nut 56 moves, it turns on the coarse threads 54, 58, causing the frame 50 to be released from its hard endstop 69 and thereafter to move parallel to the frame bore axis 53. When the antijam nut 56 reaches the internal antijam nut endstop 70 or 72, it stops turning. The frame 50 continues to move driven by the turning of the leadscrew 64, until it reaches the hard endstop 69 opposite to the one from which the movement sequence started. When the frame 50 is to be moved in the opposite direction, the rotation of the leadscrew 64 is reversed, reversing the movement of the fine threads 62 and 64. The antijam nut 56 is backed away from the antijam nut endstop 70 or 72 that it had previously contacted, thereby releasing the axial load on the leadscrew 64. The frame 50 is moved in the corresponding direction by the rotation of the leadscrew 64 and the movement of the fine threads 62 and 66. The same effect is achieved as the opposite antijam nut endstop and hard endstop are encountered. Thus, the displacement of the frame 50 is accomplished by the turning of the leadscrew 64. The antijam nut 56 eases the reversing of the movement of the frame from the hard endstops 69 by unloading the leadscrew 64 axially and "unsticking" the leadscrew to permit it to turn in the opposite direction without any need for spiking the power to the motor.

FIG. 3 illustrates the relevant portion of the projector 22 utilizing the linear actuator 20. The projector 22 includes a lens support frame 80 to which the leadscrew 64 is rotationally supported by a leadscrew support 82 engaged to the leadscrew 64. The leadscrew 64 is thereby supported from the lens support frame 80, but is permitted to turn when driven. The hard endstops 69a and 69b are formed in, or affixed to, the lens support frame 80 to provide absolute limits to the travel of the frame 50. A rotational drive 84, preferably including a reversing electrical motor 86, controllably rotates the leadscrew 64 in either rotational direction. The motor 86 is sized to provide sufficient torque to accomplish the movements, but is not so large that it overtorques and damages the frame 50 or the hard endstops 69 when the frame engages the hard endstops 69. The drive 84 may be coupled to the leadscrew 64 by any operable mechanism, such as an illustrated worm drive gear 88.

The frame 50 (shown in FIG. 3 without the lens 28 present) desirably includes a guide receiver 90 which receives the unthreaded portion 68 of the leadscrew 64 therein. The engagement of the leadscrew 64 to the antijam nut 56 and the guide receiver 90 thereby serves to ensure a linear movement between the frame 50 and the lens support frame 80. A guide receiver 91 on the lens support frame 80 may also receive the unthreaded portion 68 therein. If desired, at least one additional secondary guide rod 92 may be engaged to guide receivers 94 on the frame 50 and the lens support frame 80 to insure a precise movement with minimal wobble or chance of binding of the moving elements.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A linear actuator, comprising:
   a frame having a frame bore therein, the frame bore being threaded with an internal coarse thread;
   an antijam nut having an external coarse thread engaged to the internal coarse thread of the frame bore within the frame bore, the antijam nut further having a nut bore therethrough internally threaded with a fine thread, an axis of the nut bore being coincident with an axis of turning of the antijam nut on the coarse threads;
   a first antijam nut endstop affixed to the frame such that the antijam nut contacts the first antijam nut endstop at a first range limit within the frame bore;
   a leadscrew having at least a portion thereof externally threaded with the fine thread and engaged to the internal fine thread of the antijam nut;
   a leadscrew support engaged to the leadscrew; and
   a rotational drive operably connected to the leadscrew, the frame and the leadscrew support being linearly movable relative to each other.

2. The linear actuator of claim 1, further including
   a lens supported in the frame.

3. The linear actuator of claim 1, wherein the coarse thread has no more than about 6½ turns per inch, and the fine thread has at least about 32 turns per inch.

4. The linear actuator of claim 1, wherein a ratio of a fine thread turns-per-inch to a coarse thread turns-per-inch is from about 5:1 to about 15:1.

5. The linear actuator of claim 1, wherein the drive comprises a motor.

6. The linear actuator of claim 1, wherein the drive comprises a reversing motor.

7. The linear actuator of claim 1, wherein the drive is operable to rotate the leadscrew in either rotational direction.

8. The linear actuator of claim 1, further including
   a second antijam nut endstop affixed to the frame such that the antijam nut contacts the antijam nut endstop at a second range limit, opposite to the range limit, within the frame bore.

9. The linear actuator of claim 8, wherein the first antijam nut endstop and the second antijam nut endstop are formed as a single bracket.

10. The linear actuator of claim 1, wherein the frame further comprises
    a guide receiver having a guide bore positioned to receive an unthreaded portion of the leadscrew therein.

11. The linear actuator of claim 1, further including
    at least one hard endstop defining an absolute limit of travel of the frame.

12. A linear actuator, comprising:
    a frame having a frame bore therein, the frame bore being threaded with an internal coarse thread, the frame further including a guide receiver having a guide bore therein collinear with the frame bore;
    an antijam nut having an external coarse thread engaged to the internal coarse thread of the frame bore within the frame bore, the antijam nut further having a nut bore therethrough internally threaded with a fine thread, an axis of the nut bore being coincident with an axis of turning of the antijam nut on the coarse threads;
    a first antijam nut endstop affixed to the frame such that the antijam nut contacts the first antijam nut endstop at a first range limit within the frame bore;
    a second antijam nut endstop affixed to the frame such that the antijam nut contacts the antijam nut endstop at a second range limit, opposite to the first range limit, within the frame bore;
    a leadscrew having a first portion thereof externally threaded with the fine thread and engaged to the internal fine thread of the antijam nut, and a second portion thereof unthreaded and extending through the guide bore;
    a leadscrew support engaged to the leadscrew; and
    a rotational reversing motor connected to the leadscrew, the frame and the leadscrew support being linearly movable relative to each other.

13. The linear actuator of claim 12, further including
    a lens supported in the frame.

14. The linear actuator of claim 12, wherein the coarse thread has no more than about 6½ turns per inch, and the fine thread has at least about 32 turns per inch.

15. The linear actuator of claim 12, wherein a ratio of a fine thread turns-per-inch to a coarse thread turns-per-inch is from about 5:1 to about 15:1.

16. The linear actuator of claim 12, wherein the first antijam nut endstop and the second antijam nut endstop are formed as a single bracket.

17. The linear actuator of claim 12, further including two hard endstops defining absolute range of travel of the frame.

18. A projector, comprising:

a lens support frame having a frame bore therein, the frame bore being threaded with an internal coarse thread;

a lens supported in the lens support frame;

an antijam nut having an external coarse thread engaged to the internal coarse thread of the frame bore within the frame bore, the antijam nut further having a nut bore therethrough internally threaded with a fine thread, an axis of the nut bore being coincident with an axis of turning of the antijam nut on the coarse threads;

a first antijam nut endstop affixed to the lens support frame such that the antijam nut contacts the first antijam nut endstop at a first range limit within the frame bore;

a leadscrew having at least a portion thereof externally threaded with the fine thread and engaged to the internal thread of the antijam nut;

a main support frame to which the leadscrew is engaged; and a rotational reversing motor connected to the leadscrew, the lens support frame and the main support frame being linearly movable relative to each other.

19. The projector of claim 18, further including at least one hard endstop defining an absolute limit of travel of the frame.

\* \* \* \* \*